(12) United States Patent
Kang et al.

(10) Patent No.: US 7,824,477 B2
(45) Date of Patent: Nov. 2, 2010

(54) IONIZER MOUNTING STRUCTURE FOR A VEHICLE AIR CONDITIONING SYSTEM

(75) Inventors: Sung Ho Kang, Daejeon (KR); Sang Chul Byon, Daejeon (KR); Yong Eun Seo, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 293 days.

(21) Appl. No.: 12/101,072

(22) Filed: Apr. 10, 2008

(65) Prior Publication Data

US 2008/0250931 A1 Oct. 16, 2008

(30) Foreign Application Priority Data

Apr. 13, 2007 (KR) ............... 10-2007-0036274
Mar. 27, 2008 (KR) ............... 10-2008-0028475

(51) Int. Cl.
B03C 3/40 (2006.01)
(52) U.S. Cl. ............... 96/83; 96/39; 96/88; 96/94; 96/97; 313/351
(58) Field of Classification Search .......... 96/29, 96/39, 83, 88, 94–97; 313/309, 351; 62/3.1; 361/225–235
See application file for complete search history.

(56) References Cited

U.S. PATENT DOCUMENTS

| | | | | |
|---|---|---|---|---|
| 3,957,374 A * | 5/1976 | Kriese et al. | ............... | 356/312 |
| 5,065,272 A * | 11/1991 | Owen et al. | ............... | 361/231 |
| 5,332,425 A * | 7/1994 | Huang | ............... | 96/26 |
| 5,707,429 A * | 1/1998 | Lewis | ............... | 96/63 |
| 6,294,004 B1 * | 9/2001 | Summers et al. | ............... | 96/66 |
| 6,368,392 B1 * | 4/2002 | Ohtake et al. | ............... | 96/65 |
| 6,464,754 B1 * | 10/2002 | Ford | ............... | 95/26 |
| 6,506,238 B1 * | 1/2003 | Endo | ............... | 96/79 |
| 6,508,982 B1 * | 1/2003 | Shoji | ............... | 422/22 |
| 6,635,105 B2 * | 10/2003 | Ahlborn et al. | ............... | 96/28 |
| 6,955,708 B1 * | 10/2005 | Julos et al. | ............... | 95/59 |
| 7,497,898 B2 * | 3/2009 | Sato et al. | ............... | 96/43 |
| 7,553,354 B2 * | 6/2009 | Borisenko | ............... | 96/39 |
| 7,601,204 B2 * | 10/2009 | Woodruff et al. | ............... | 96/30 |
| 2004/0045442 A1 * | 3/2004 | Ziya Ramizovich et al. | ... | 96/94 |

(Continued)

FOREIGN PATENT DOCUMENTS

JP 53-2767 A * 1/1978 ............... 96/97

(Continued)

*Primary Examiner*—Richard L Chiesa
(74) *Attorney, Agent, or Firm*—Patent Law Group LLP; Carmen C. Cook

(57) ABSTRACT

The present invention relates to an ionizer mounting structure for a vehicle air conditioning system. The air conditioning system includes an air conditioning case having an internal passageway and an ionizer for generating negative ions and positive ions within the internal passageway. The air conditioning case has a discharge electrode insertion hole and the ionizer has a plurality of discharge electrodes extending into the internal passageway through the discharge electrode insertion hole. The ionizer mounting structure includes a mounting and demounting structure for allowing the ionizer to be mounted to the air conditioning case through sliding movement from a demounting position on a passenger room side to a mounting position above the air conditioning case and for allowing the ionizer to be demounted from the air conditioning case through sliding movement from the mounting position to the demounting position.

11 Claims, 9 Drawing Sheets

U.S. PATENT DOCUMENTS

2007/0034082 A1 * 2/2007 Adair et al. .................... 96/63

FOREIGN PATENT DOCUMENTS

| JP | 4-114752 A * | 4/1992 | .................... 96/97 |
| JP | 2004130917 | 4/2004 | |
| JP | 16-196101 A | 7/2004 | |
| KR | 2006-0102226 A | 9/2006 | |
| KR | 20070071571 | 7/2007 | |
| KR | 20070115037 | 12/2007 | |

* cited by examiner

IONIZER MOUNTING STRUCTURE FOR A VEHICLE AIR CONDITIONING SYSTEM

FIELD OF THE INVENTION

The present invention relates to an ionizer mounting structure for a vehicle air conditioning system and, more particularly, to an ionizer mounting structure for a vehicle air conditioning system that enables an ionizer to be mounted and removed with ease, thereby improving the ease of maintenance when repairing and replacing the ionizer.

BACKGROUND OF THE INVENTION

An automotive vehicle is provided with an air conditioning system for controlling the temperature of a vehicle room air. As shown in FIG. 1, a conventional air conditioning system includes an air conditioning case 10 in which a blower 20 is installed. In general, the air conditioning case 10 is arranged inside of an instrument panel in front of a passenger seat.

The blower 20 includes a blower fan 22 and a blower motor 24 for driving the blower fan 22. The blower 20 serves to inhale an external air or an internal air and then to feed the inhaled air to an internal passageway 12 of the air conditioning case 10.

The air conditioning system further includes an evaporator 30 arranged inside the internal passageway 12 of the air conditioning case 10. The evaporator 30 includes a plurality of coolant tubes (not shown) through which coolant can flow. The evaporator 30 serves to cool the air passing through the internal passageway 12 and also to introduce the cooled air into a vehicle room, thereby keeping the vehicle room at a pleasant temperature.

The air conditioning system further includes an ionizer 40 for emitting positive ions and negative ions toward the air flowing through the internal passageway 12. As illustrated in FIGS. 1 and 2, the ionizer 40 is installed on the upstream side of the evaporator 30 and includes a main body 42 attached to a side wall of the air conditioning case 10, and first and second discharge electrodes (44, 46) extending from the main body 42 into the internal passageway 12 in a spaced-apart relationship with each other.

The main body 42 is provided with joint pieces 42a at its peripheral edge. The joint pieces 42a are fixedly secured to the air conditioning case 10 by driving screws 42b into a side surface of the air conditioning case 10 through the joint pieces 42a.

The first and second discharge electrodes (44, 46) are arranged one above the other in a spaced-apart relationship with each other and extend into the internal passageway 12 through electrode insertion holes 14 formed in the air conditioning case 10. The first and second discharge electrodes (44, 46) are designed to generate negative ions and positive ions by irradiating high voltage pulses into the air flowing through the internal passageway 12.

The negative ions and positive ions generated in the ionizer 40 are introduced into the evaporator 30 to sterilize bacteria and mold living in the evaporator 30 and also to deodorize the air supplied into the vehicle room, thereby enhancing the degree of cleanliness of the air introduced into the vehicle room and creating a comfortable vehicle room environment.

However, the conventional air conditioning system referred to above poses a problem in that it is very difficult to separate the ionizer 40 when the ionizer 40 is removed from the air conditioning case 10 to repair or replace the same.

In other words, since the air conditioning case 10 is installed inside the instrument panel in front of the passenger seat, the spare space left around the air conditioning case 10 is very narrow and small. In particular, as can be seen in FIG. 2, a dash board 16 is arranged near the air conditioning case 10 at a narrow interval, which leaves a small space between the dash board 16 and the ionizer 40. This makes it difficult to insert a tool and loosen the screws 42b. Even after the screws 42b are loosened and removed, it is very inconvenient and difficult to demount the ionizer 40 from the air conditioning case 10.

Consequently, the conventional air conditioning system is problematic in that it is very difficult to detach the ionizer 40 from the air conditioning case 10 and to attach the same to the air conditioning case 10.

In addition, the first and second discharge electrodes (44, 46) of the ionizer 40 are arranged one above the other in the conventional air conditioning system. This leads to a drawback in that the moisture condensed in and around the upper first discharge electrode 44 flows toward the lower second discharge electrode 46. Such a drawback poses a problem in that the first and second discharge electrodes (44, 46) may be electrically connected to each other. The electrical connection may cause a spark between the first and second discharge electrodes (44, 46), consequently generating a discharge noise.

SUMMARY OF THE INVENTION

In view of the above-noted problems inherent in the prior art, it is an object of the present invention to provide an ionizer mounting structure for a vehicle air conditioning system that enables an ionizer to be removed and mounted in an easy and simple manner.

Another object of the present invention is to provide an ionizer mounting structure for a vehicle air conditioning system that can improve the workability in maintenance and repair.

A further object of the present invention is to provide an ionizer mounting structure for a vehicle air conditioning system that can prevent electric connection between first and second discharge electrodes, which would otherwise be caused by ambient moisture.

A still further object of the present invention is to provide an ionizer mounting structure for a vehicle air conditioning system capable of preventing generation of a spark between first and second discharge electrodes and resultant generation of a discharge noise, which would otherwise be caused by electric connection between the first and second discharge electrodes.

With the above objects in view, the present invention provides an ionizer mounting structure for a vehicle air conditioning system, the air conditioning system including an air conditioning case having an internal passageway and an ionizer for generating negative ions and positive ions within the internal passageway, the air conditioning case having a discharge electrode insertion hole, the ionizer having a plurality of discharge electrodes extending into the internal passageway through the discharge electrode insertion hole, wherein the ionizer mounting structure comprises a mounting and demounting means for allowing the ionizer to be mounted to the air conditioning case through sliding movement from a demounting position on a passenger room side to a mounting position above the air conditioning case and for allowing the ionizer to be demounted from the air conditioning case through sliding movement from the mounting position to the demounting position.

The mounting and demounting means may comprise a guide means for guiding the ionizer as the ionizer is slidingly moved between the demounting position and the mounting position and a fixing means for fixing a first side portion of the ionizer to the air conditioning case in the mounting position.

In accordance with the present ionizer mounting structure for a vehicle air conditioning system, the ionizer is demounted by sliding the same toward a passenger room. This provides an effect that the ionizer can be easily demounted even if the space left around the ionizer is narrow and small. It is also quite easy and convenient to mount the ionizer to an original position.

This makes it possible to rapidly repair and replace the ionizer, consequently improving the workability to the greatest possible extent.

Furthermore, since the ionizer is installed on the upper surface of the air conditioning case, it becomes possible to protect the ionizer from the moisture flowing in a gravitational direction. As a result, it is possible to prevent electric connection between the discharge electrodes, which would otherwise be caused by the ambient moisture.

This makes it possible to prevent generation of a spark between the first and second discharge electrodes and resultant generation of a discharge noise, which would otherwise be caused by the electric connection between the discharge electrodes.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Figure 1:
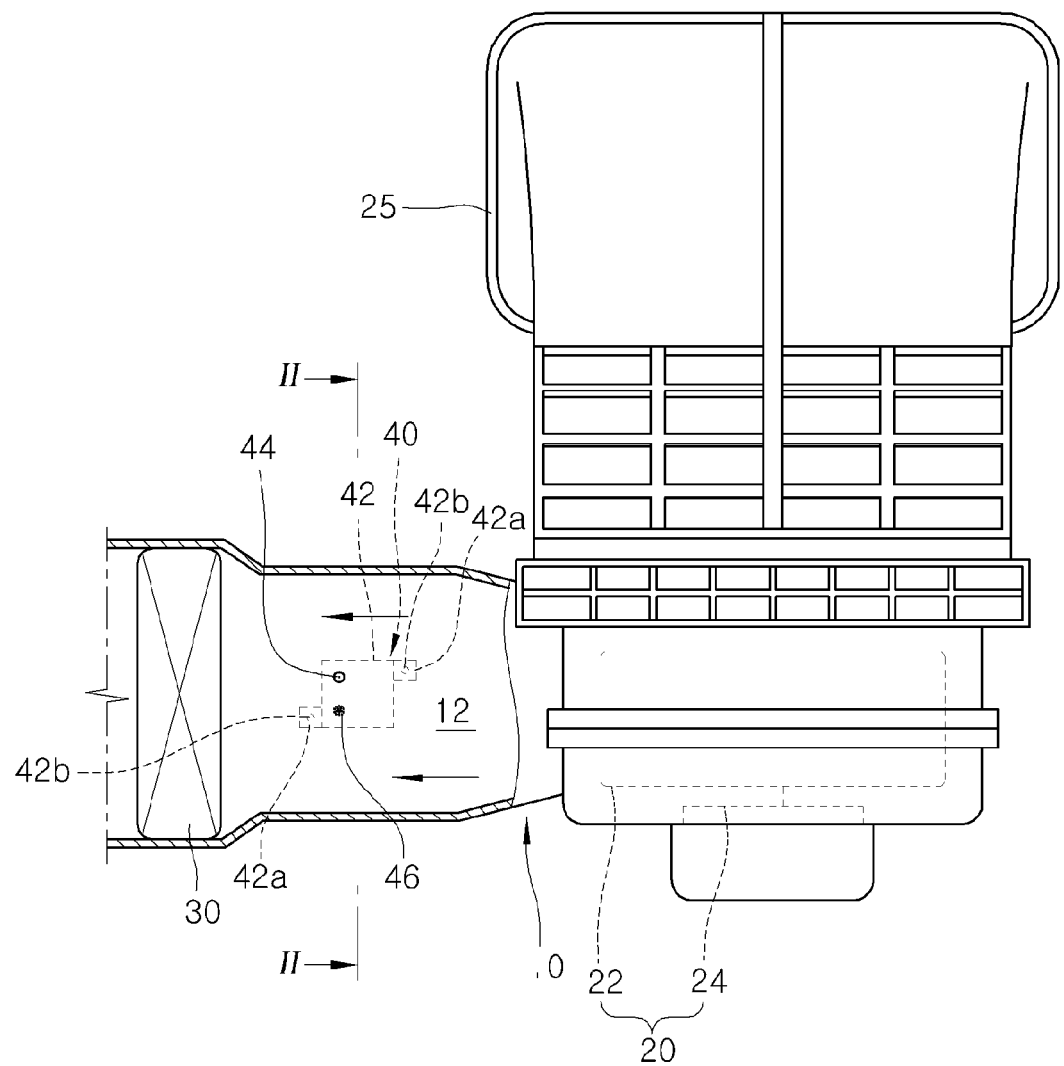
FIG. 1 is a partial section view showing a conventional air conditioning system.
Figure 2:
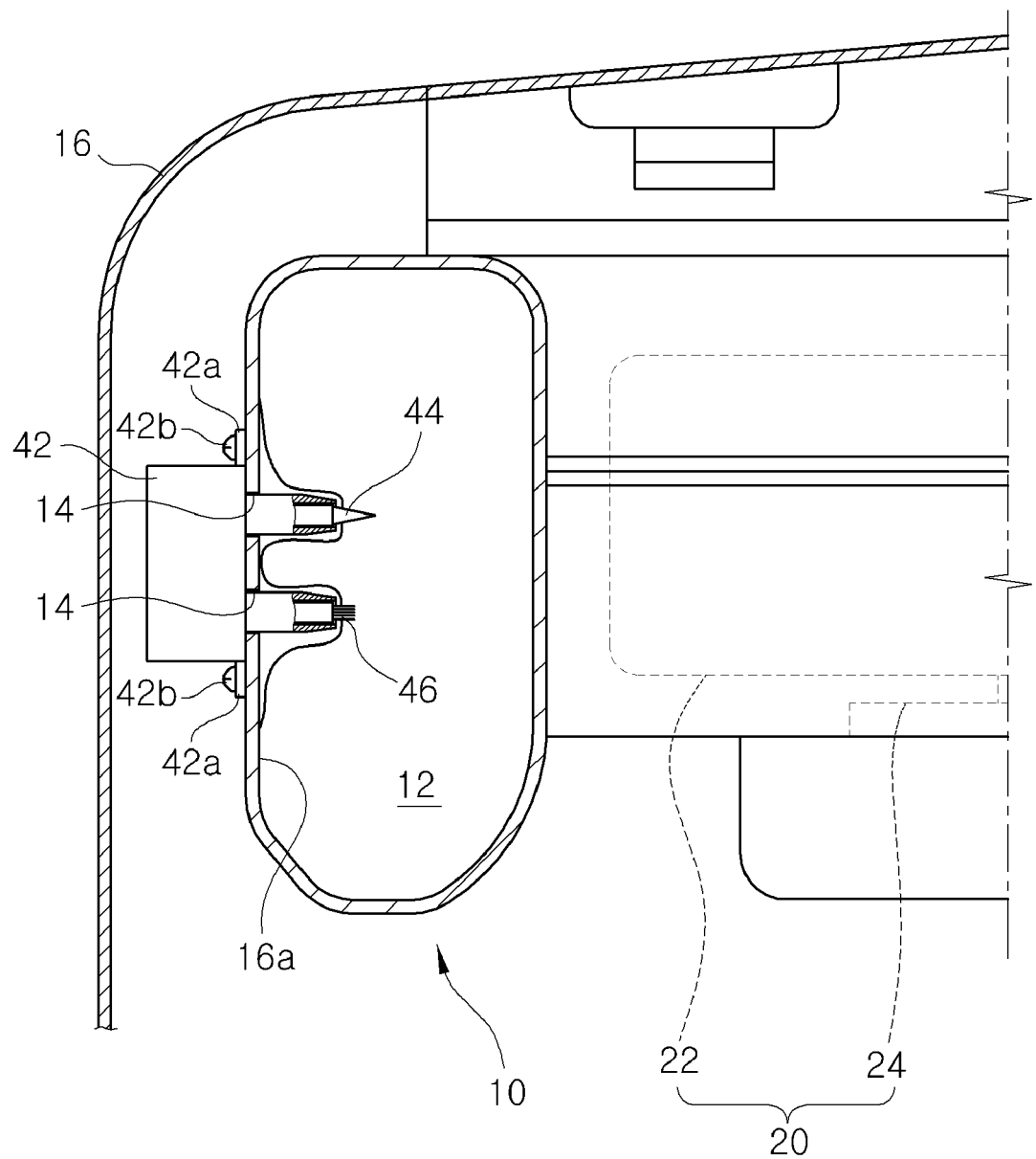
FIG. 2 is a section view taken along line II-II in FIG. 1, showing an ionizer mounting structure employed in the conventional air conditioning system.

A preferred embodiment of an ionizer mounting structure for a vehicle air conditioning system in accordance with the present invention will now be described in detail with reference to the accompanying drawings. In the following description, the same reference numerals as used in describing the prior art will be used to designate the same elements as those of the prior art.

Figure 3:
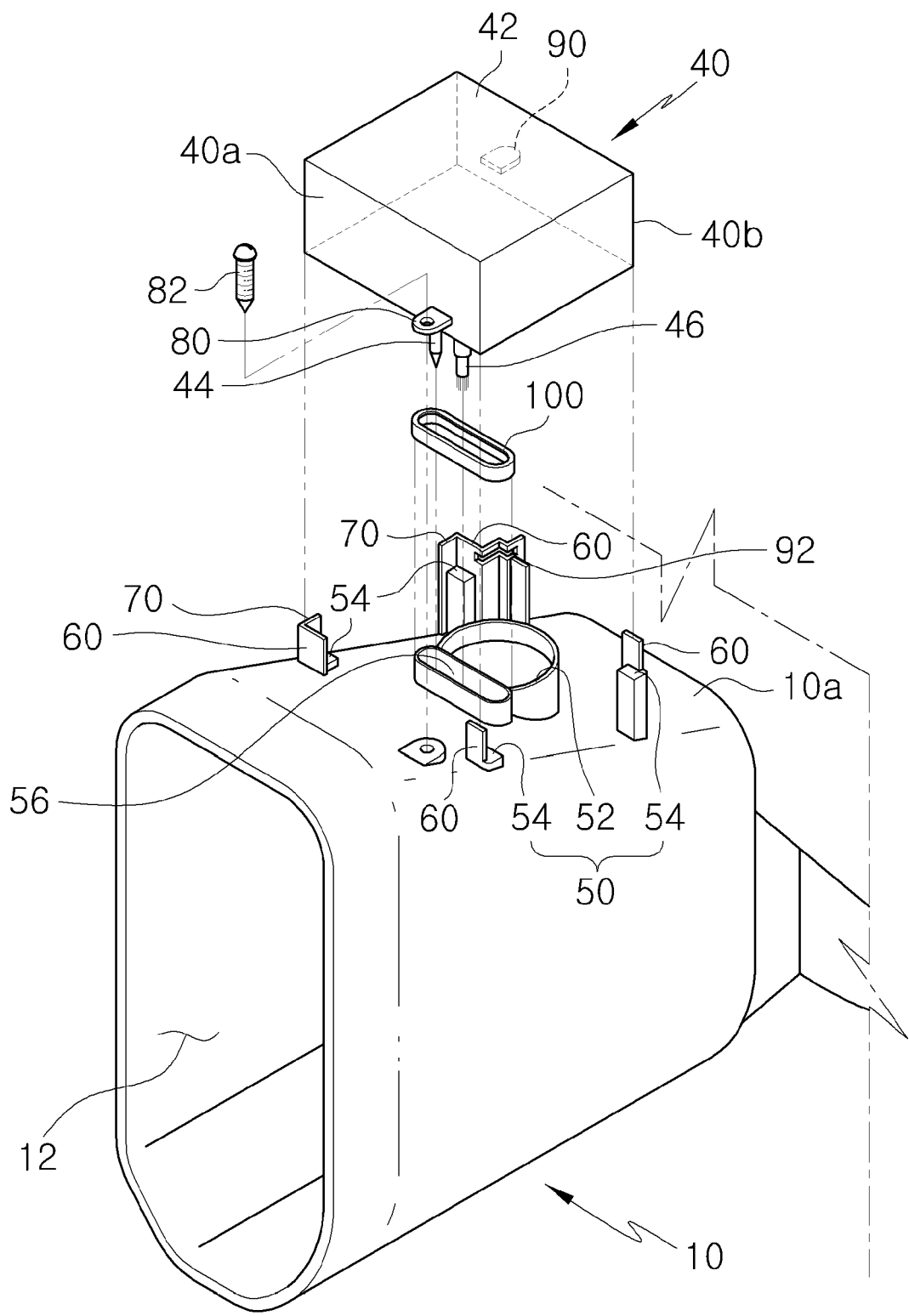
FIG. 3 is an exploded perspective view showing an ionizer mounting structure for a vehicle air conditioning system in accordance with the present invention.

Prior to describing the ionizer mounting structure in accordance with the present invention, a general aspect of an ionizer of a vehicle air conditioning system will be described with reference to FIGS. 3 and 4.

The ionizer 40 includes a main body 42 attached to an upper surface of an air conditioning case 10. The main body 42 has a rectangular box shape and includes first and second discharge electrodes (44, 46) arranged in a spaced-apart relationship with each other.

The first and second discharge electrodes (44, 46) extend into an internal passageway 12 of the air conditioning case 10 and serve to generate negative ions and positive ions by irradiating high-voltage pulses into the air flowing through the internal passageway 12.

Next, description will be made on the ionizer mounting structure in accordance with the present invention. As shown in FIGS. 3 to 7, the ionizer mounting structure includes a support arrangement 50 provided on the upper surface of the air conditioning case 10 so that it can support the ionizer 40.

The support arrangement 50 includes a central support portion 52 for supporting the bottom center portion of the ionizer 40 and four corner support portions 54 for supporting the four corners of the ionizer 40. The support arrangement 50 is designed to support the lower surface of the ionizer 40 in such a manner that the ionizer 40 is horizontally held on the upper surface of the air conditioning case 10. In this regard, it is preferred that the support arrangement 50 be arranged on the upper surface of a blower case 10a that constitutes a part of the air conditioning case 10.

The ionizer mounting structure is provided with a discharge electrode insertion hole 56 through which the first and second discharge electrodes (44, 46) can be inserted. The discharge electrode insertion hole 56 is formed on the upper surface of the air conditioning case 10 and is led to the internal passageway 12. The discharge electrode insertion hole 56 is formed in the form of a slot along a lateral direction of the air conditioning case 10 so that the first and second discharge electrodes (44, 46) can be inserted into the discharge electrode insertion hole 56.

Therefore, the first and second discharge electrodes (44, 46) of the ionizer 40 supported on the support arrangement 50 can extend into the internal passageway 12 through the discharge electrode insertion hole 56 formed on the upper surface of the air conditioning case 10.

The discharge electrode insertion hole 56 formed on the upper surface of the air conditioning case 10 allows the discharge electrodes (44, 46) of the ionizer 40 to extend from the upper surface of the air conditioning case 10 toward the upper space of the internal passageway 12. Therefore, the discharge electrodes (44, 46) are arranged in an upper position along a gravitational direction and are protected from the moisture flowing in the gravitational direction. Consequently, it is possible to prevent electric connection between the discharge electrodes (44, 46), which would otherwise be caused by the ambient moisture.

Referring again to FIGS. 3 to 7, the ionizer mounting structure includes a guide means for guiding the ionizer 40 so that the ionizer 40 supported on the support arrangement 50 can be slid in a lateral direction of the air conditioning case 10, i.e., toward the passenger room side "A".

The guide means is comprised of four guide ribs 60 protruding upwardly from the upper surface of the air conditioning case 10. The guide ribs 60 serve to slidingly guide the front surface 40a and the rear surface 40b of the ionizer 40 so that the ionizer 40 can be slid in the lateral direction of the air conditioning case 10. More specifically, the guide ribs 60 are designed to guide the sliding movement of the ionizer 40 from a mounting position X above the air conditioning case 10 to a demounting position Y on the passenger room side "A" and vice versa.

The first and second discharge electrodes (44, 46) are moved together with the ionizer 40 as the latter makes the sliding movement between the mounting position X and the demounting position Y. For this reason, the slot-like discharge electrode insertion hole 56 that receives the first and second discharge electrodes (44, 46) needs to have a length great enough not to hinder the sliding movement of the discharge electrodes (44, 46).

With the guide means set forth above, the ionizer 40 is allowed to make sliding movement between the mounting position X and the demounting position Y, which makes it possible to mount and demount the ionizer 40 to and from the air conditioning case 10 with ease.

In particular, since the ionizer 40 is demounted from the air conditioning case 10 toward the passenger room side "A", it is possible to readily demount the ionizer 40 with no likelihood of physical interference with the dash board 16 arranged in front of the air conditioning case 10. This makes it easy to perform the task of mounting and demounting the ionizer 40 when repairing or replacing the same.

Referring again to FIGS. 3 to 7, the ionizer mounting structure includes stoppers 70 for stopping the ionizer 40 in the mounting position X when the ionizer 40 is slid from the demounting position Y to the mounting position X. The stoppers 70 are integrally formed with the guide ribs 60 and are designed to abut with the ionizer 40 at the end of sliding movement of the ionizer 40 toward the mounting position X. This assists in aligning the ionizer 40 in the mounting position X.

The ionizer mounting structure includes a fixing means for fixing a first side portion of the ionizer 40 in the mounting position X. The fixing means includes a fixing piece 80 formed in the first side portion of the ionizer 40 and a fastening screw 82 for fastening the fixing piece 80 of the ionizer 40 to the air conditioning case 10 in the mounting position X. The fixing means serves to fix the first side portion of the ionizer 40 in the mounting position X, thereby keeping the ionizer 40 against any unintentional removal.

It is preferred that the fixing piece 80 of the ionizer 40 be formed in the edge of the ionizer 40 nearer to the passenger room side "A" as far as possible. The reason is that, if the fixing piece 80 is formed in such a position, it becomes easy to insert a tool from the passenger room side "A" and to loosen or tighten the fastening screw 82 from and to the fixing piece 80 as is clear in FIG. 4.

Referring again to FIGS. 3 to 7, the ionizer mounting structure includes an auxiliary fixing means for fixing a second side portion of the ionizer 40. The auxiliary fixing means includes an auxiliary fixing piece 90 formed in the second side portion of the ionizer 40 and a engagement slot 92 formed in the air conditioning case 10 so that the auxiliary fixing piece 90 can engage with the engagement slot 92 when the ionizer 40 is moved into the mounting position X.

The auxiliary fixing piece 90 and the engagement slot 92 are engaged with each other as the ionizer 40 is moved into the mounting position X, thereby serving to fix the second side portion of the ionizer 40 to the air conditioning case 10. In this way, the auxiliary fixing means cooperate with the fixing means to fix the first side portion and the second side portion of the ionizer 40, thus fixing the ionizer 40 with increased force.

The auxiliary fixing piece 90 and the engagement slot 92 are designed to automatically fix the second side portion of the ionizer 40 when the ionizer 40 is slid from the demounting position Y to the mounting position X. This makes it possible to fix the ionizer 40 to the air conditioning case 10 without having to use a fastening screw or other additional fasteners. Therefore, there is no need to use a tool in fixing the second side portion of the ionizer 40 to the air conditioning case 10. This makes it easy to mount and demount the ionizer 40.

It is preferred that the auxiliary fixing piece 90 and the engagement slot 92 of the auxiliary fixing means be arranged in a diagonally opposite position relative to the fixing piece 80 of the fixing means. This is to fix the ionizer 40 to the air conditioning case 10 with the greatest possible force.

It is also preferred that the auxiliary fixing piece 90 and the engagement slot 92 of the auxiliary fixing means be formed nearer to an engine room side or an intake duct side 25 (see FIG. 1). This is to arrange the auxiliary fixing means in the position to which a tool is hard to gain access. By doing so, it becomes possible to mount and demount the ionizer 40 without having to use any tool as far as the auxiliary fixing means is concerned.

Referring again to FIGS. 3 to 7, the ionizer mounting structure includes a seal member 100 for sealing the gap between the discharge electrode insertion hole 56 of the air conditioning case 10 and the ionizer 40. The seal member 100 is made of rubber or the like and is arranged between the edge of the discharge electrode insertion hole 56 and the lower surface of the ionizer 40. The seal member 100 serves to hermetically seal the gap between the edge of the discharge electrode insertion hole 56 and the lower surface of the ionizer 40. This prevents foreign materials, e.g., dust or moisture, from infiltrating into the air conditioning case 10 through between the discharge electrode insertion hole 56 and the ionizer 40.

Next, description will be made on a process of demounting and mounting the ionizer 40 from and to the air conditioning case 10 by use of the present ionizer mounting structure.

Figure 6:
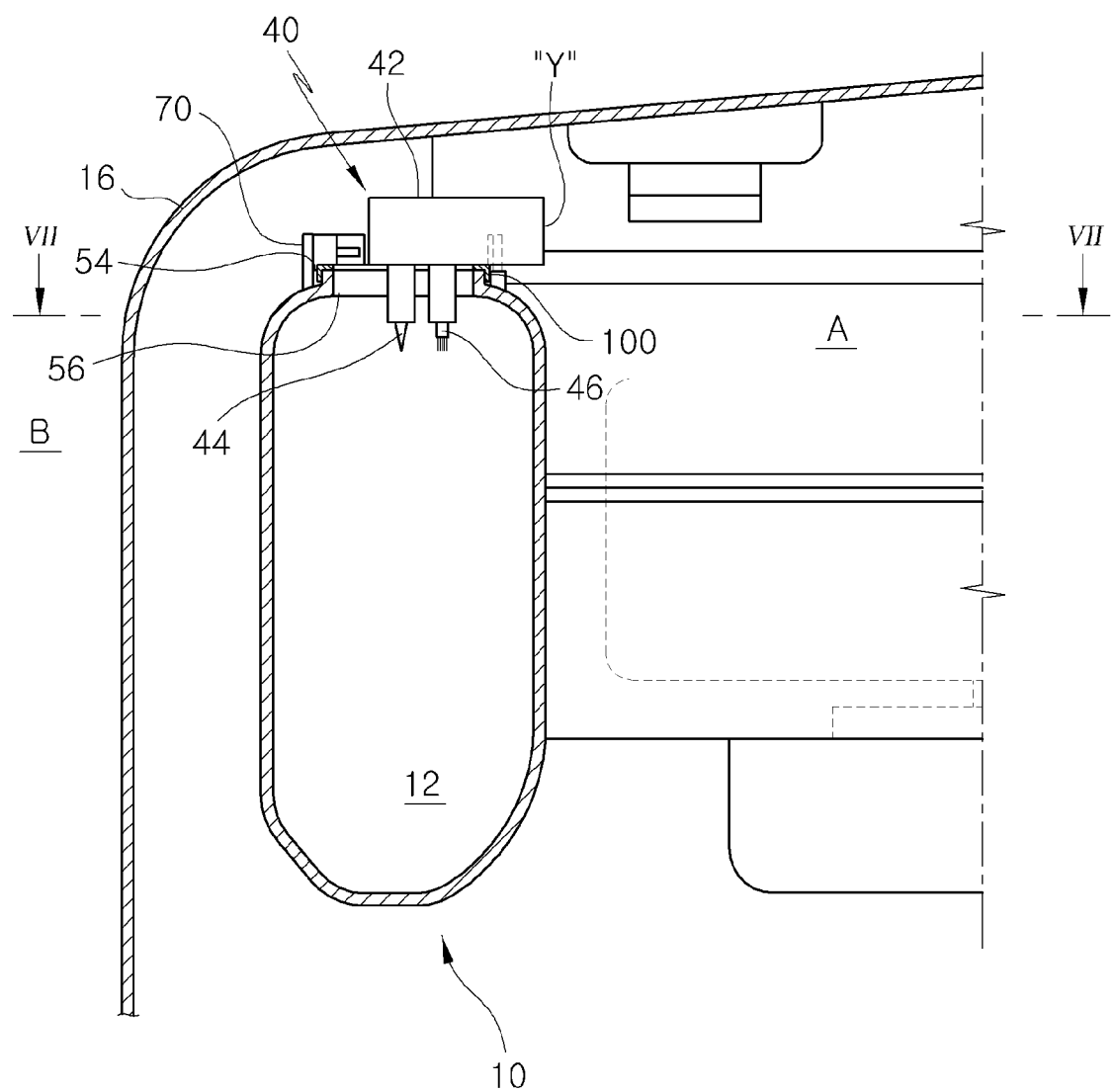
FIG. 6 is a section view illustrating an operation example of the ionizer mounting structure in accordance with the present invention, which view shows a process of demounting the ionizer from the air conditioning case.

A process of demounting the ionizer 40 from the air conditioning case 10 will be described first. As shown in FIGS. 4 and 6, the fastening screw 82 for fastening the fixing piece 80 of the ionizer 40 to the air conditioning case 10 is loosened and removed by use of, e.g., a screw driver.

Figure 5:
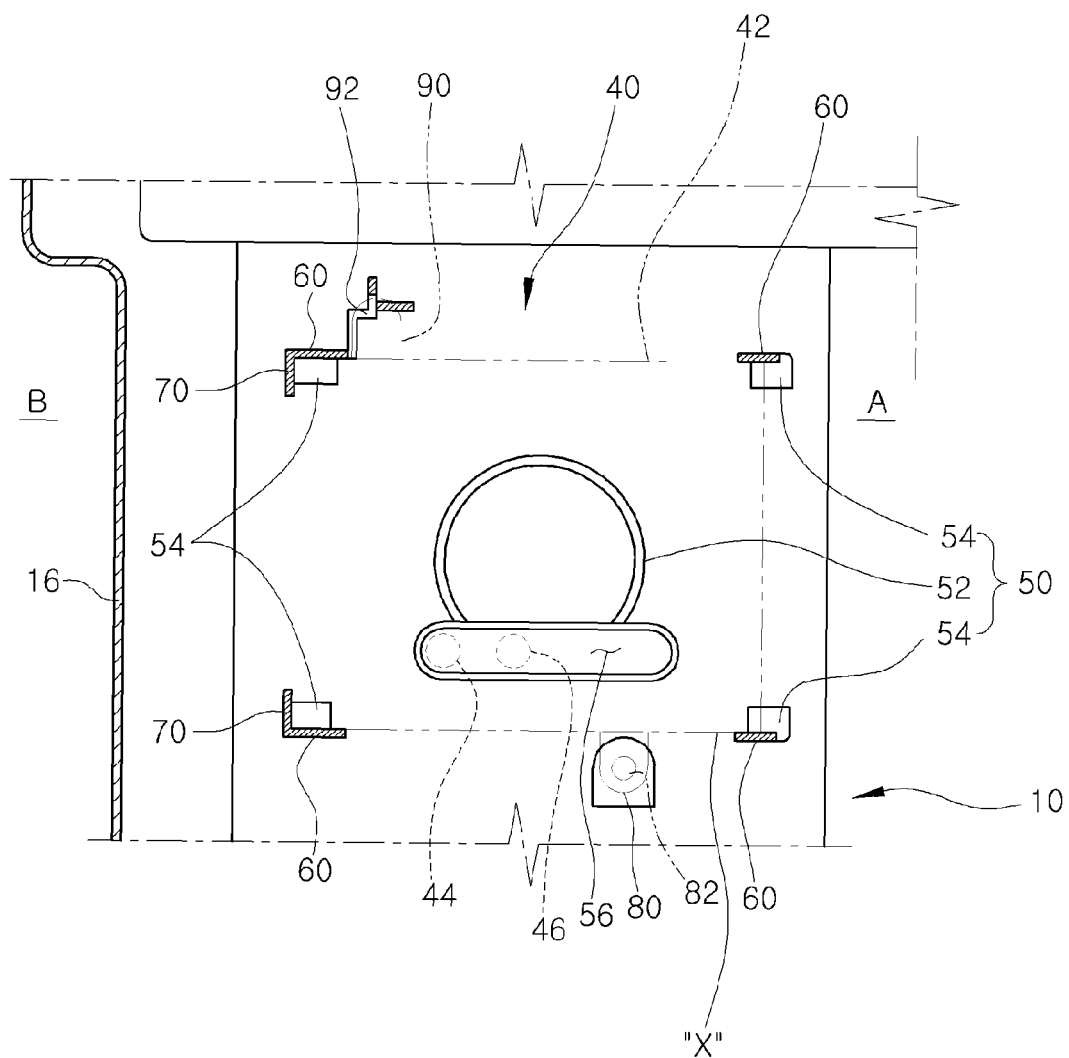
FIG. 5 is a section view taken along line V-V in FIG. 4.
Figure 7:
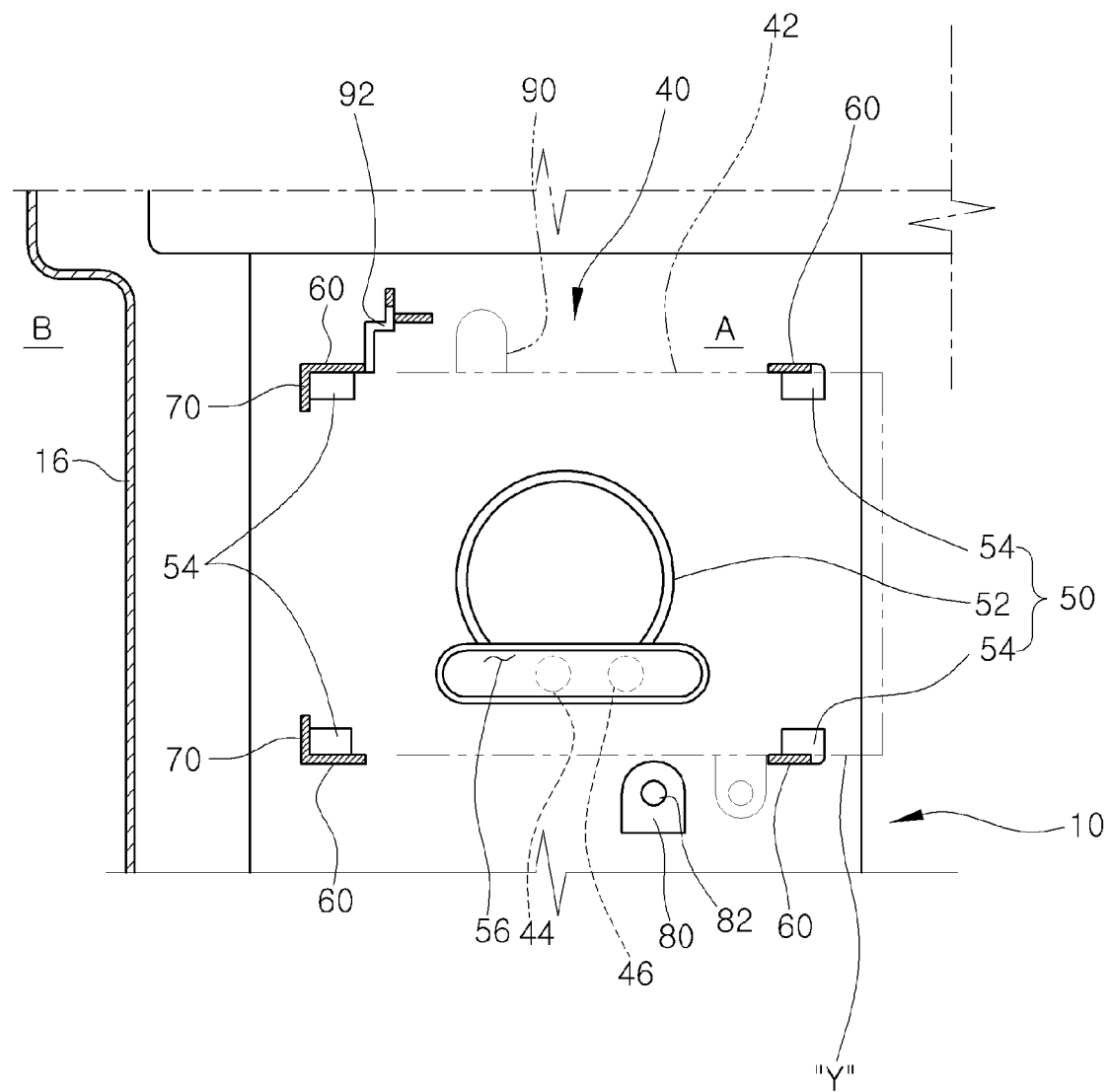
FIG. 7 is a section view taken along line VII-VII in FIG. 6.

Once the fastening screw 82 is removed, the ionizer 40 is slid toward the passenger room "A" from the mounting position X to the demounting position Y as illustrated in FIGS. 5 and 7. At this time, the auxiliary fixing piece 90 of the ionizer 40 is disengaged from the engagement slot 92 of the air conditioning case 10.

Then, the ionizer 40 moved to the demounting position Y is lifted upwardly from the air conditioning case 10, in which process the first and second discharge electrodes (44, 46) of the ionizer 40 are pulled out of the discharge electrode insertion hole 56 and completely separated from the air conditioning case 10. In this manner, the ionizer 40 is removed from the air conditioning case 10 in an easy and simple manner. This enables a worker to readily repair or replace the ionizer 40.

A process of mounting the ionizer 40 to the air conditioning case 10 is as follows.

First, the ionizer 40 is placed above the demounting position Y shown in FIGS. 5 and 7, in which state the first and second discharge electrodes (44, 46) are inserted into the discharge electrode insertion hole 56 of the air conditioning case 10. Then, the ionizer 40 is supported on the support arrangement 50 formed on the upper surface of the air conditioning case 10.

Figure 4:
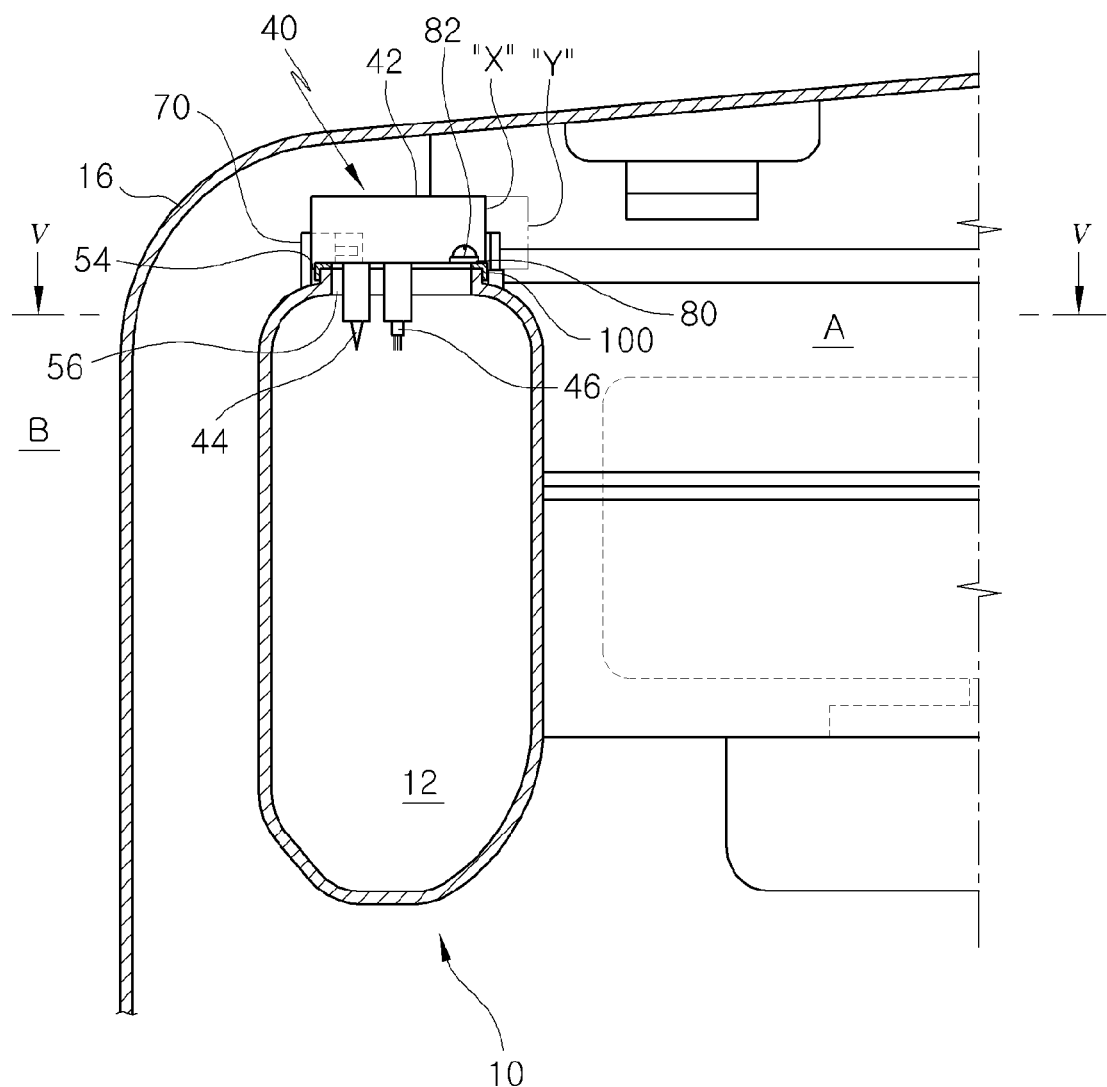
FIG. 4 is a section view of the ionizer mounting structure shown in FIG. 3, in which an ionizer is mounted to an air conditioning case.

Then, the ionizer 40 is slid toward the engine room from the demounting position Y to the mounting position X as illustrated in FIGS. 4 and 6. As the ionizer 40 is caused to move into the mounting position X, the auxiliary fixing piece 90 of the ionizer 40 engages with the engagement slot 92 of the air conditioning case 10. Thus, the second side portion of the ionizer 40 is fixed to the air conditioning case 10. At the end of the sliding movement, the ionizer 40 makes contact with the stoppers 70 and stops in the mounting position X.

Once the ionizer 40 is placed in the mounting position X, the fixing piece 80 of the ionizer 40 is fastened to the air conditioning case 10 by use of the fastening screw 82. Thus, the first side portion of the ionizer 40 is fixed to the air conditioning case 10. In this manner, the task of fixing the ionizer 40 to the air conditioning case 10 is completed. Since the ionizer 40 is fixed to the air conditioning case 10 at its first and second side portions, it is possible to mount the ionizer 40 with an increased force.

Figure 8:
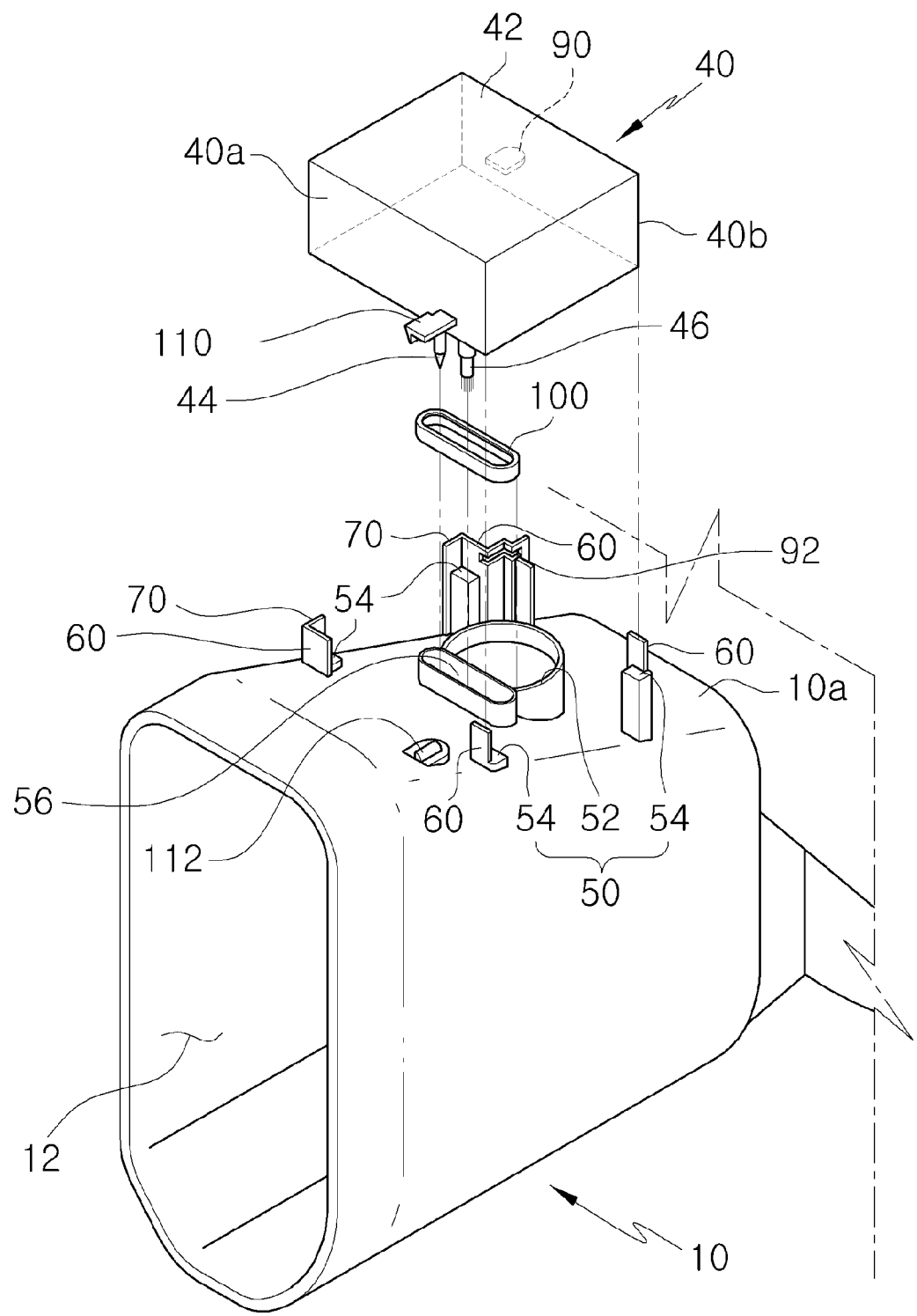
FIG. 8 is a perspective view showing a modified example of the ionizer fixing means that constitutes the ionizer mounting structure in accordance with the present invention.
Figure 9:
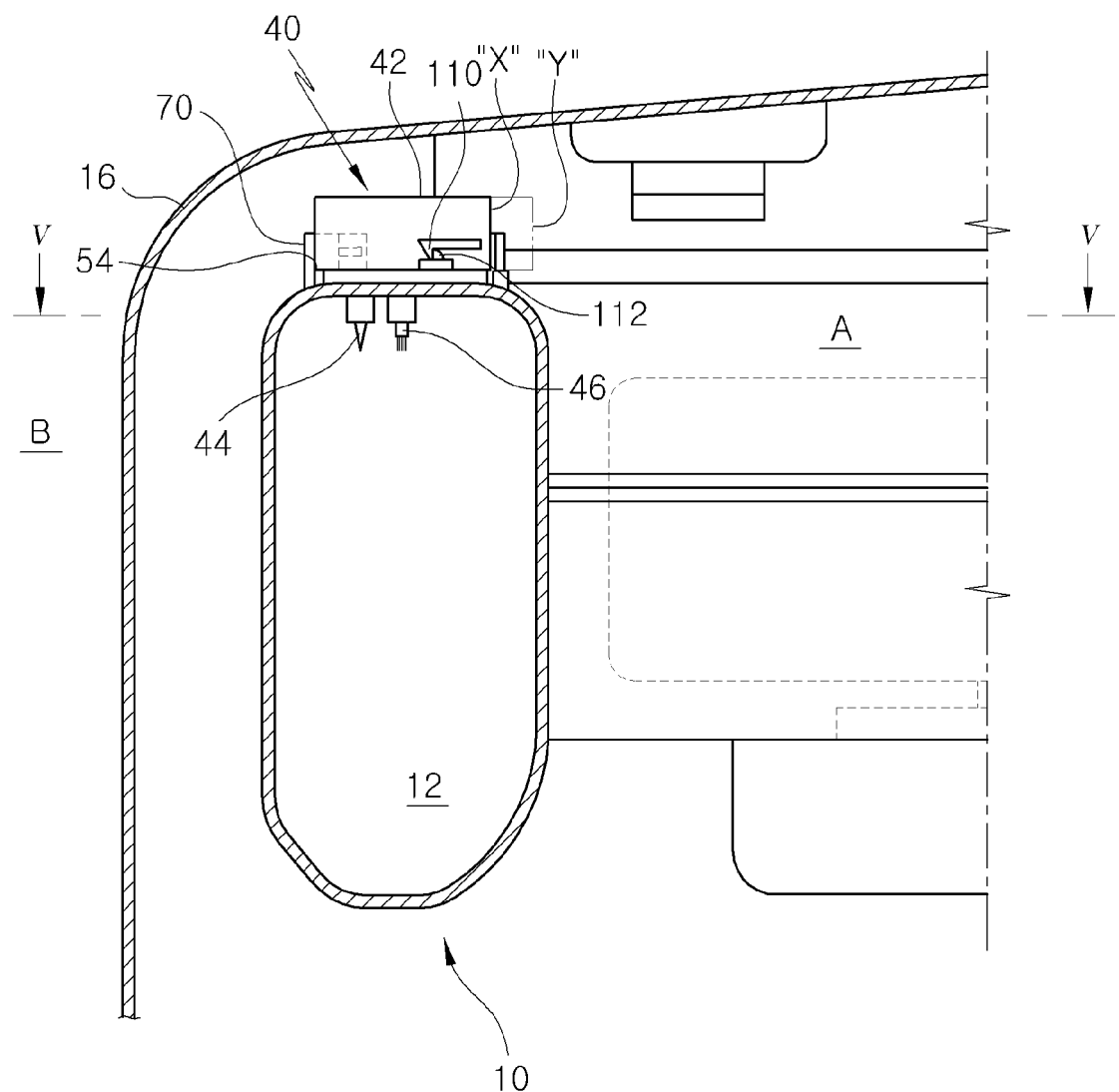
FIG. 9 is a section view of the ionizer mounting structure shown in FIG. 8, in which an ionizer is in an assembled state.

FIGS. 8 and 9 show a modified example of the fixing means for fixing the first side portion of the ionizer 40 in place. The fixing means of the modified example includes an engagement hook 110 formed in the first side portion of the ionizer 40 and an engagement protrusion 112 formed in the air conditioning case 10 so that it can engage with the engagement hook 110.

The engagement protrusion 112 engages with the engagement hook 110 of the ionizer 40 as the ionizer 40 is moved into the mounting position X. Thus, the engagement protrusion 112 cooperates with the engagement hook 110 to fix the first side portion of the ionizer 40 to the air conditioning case 10.

With the fixing means of the modified example, it is possible to fix the ionizer 40 to the air conditioning case 10 without having to use a separate fastening screw. This is because the ionizer 40 is fixed in place by use of the engagement hook 110 and the engagement protrusion 112. This eliminates the need to use a tool which would otherwise be needed to tighten or loosen a fastening screw. As a result, it becomes easy to mount and demount the ionizer 40.

Although the ionizer 40 is mounted and demounted by sliding the same on the upper surface of the air conditioning case 10 in the embodiment shown and described above, it may be possible to slidingly mount and demount the ionizer 40 on the side surface or the lower surface of the air conditioning case 10. In other words, the ionizer mounting structure may be provided in any portion of the air conditioning case 10 if it allows the ionizer 40 to be slidingly mounted and demounted between the mounting position X and the demounting position Y.

While one preferred embodiment of the invention has been described hereinabove, the present invention is not limited thereto. It is to be understood that various changes and modifications may be made without departing from the scope of the invention defined in the claims.

What is claimed is:

1. An ionizer mounting structure for a vehicle air conditioning system, the air conditioning system including an air conditioning case having an internal passageway and an ionizer for generating negative ions and positive ions within the internal passageway, the air conditioning case having a discharge electrode insertion hole, the ionizer having a plurality of discharge electrodes extending into the internal passageway through the discharge electrode insertion hole, wherein the ionizer mounting structure comprises a mounting and demounting means for allowing the ionizer to be mounted to the air conditioning case through sliding movement from a demounting position (Y) on a passenger room side (A) to a mounting position (X) above the air conditioning case and for allowing the ionizer to be demounted from the air conditioning case through sliding movement from the mounting position (X) to the demounting position (Y), wherein the mounting and demounting means comprises a guide means for guiding the ionizer as the ionizer is slidingly moved between the demounting position (Y) and the mounting position (X) and a fixing means for fixing the ionizer to the air conditioning case in the mounting position (X), and wherein the guide means comprises a plurality of guide ribs formed on an upper surface of the air conditioning case for guiding the sliding movement of the ionizer.

2. The ionizer mounting structure for a vehicle air conditioning system according to claim 1, wherein the fixing means comprises a fixing piece formed in the ionizer and a fastening member for fastening the fixing piece of the ionizer to the air conditioning case in the mounting position (X).

3. The ionizer mounting structure for a vehicle air conditioning system according to claim 2, wherein the fixing piece is formed in a portion of the ionizer near to the passenger room side (A) so that the fastening member can be driven in a working position near to the passenger room side (A).

4. The ionizer mounting structure for a vehicle air conditioning system according to claim 2, wherein the mounting and demounting means further comprises an auxiliary fixing means for fixing a side portion of the ionizer in place, the auxiliary fixing means including an auxiliary fixing piece formed in a side portion of the ionizer and an engagement slot formed in the air conditioning case so that the auxiliary fixing piece can engage with the engagement slot.

5. The ionizer mounting structure for a vehicle air conditioning system according to claim 4, wherein the auxiliary fixing piece is formed in a portion of the ionizer near to an engine room.

6. The ionizer mounting structure for a vehicle air conditioning system according to claim 1, wherein the fixing means includes an engagement hook and an engagement protrusion formed in a side portion of the ionizer and in the air conditioning case so that the engagement protrusion can engage with the engagement hook in the mounting position (X).

7. The ionizer mounting structure for a vehicle air conditioning system according to claim 1, further comprising a seal member for hermetically sealing a gap between the discharge electrode insertion hole of the air conditioning case and the ionizer.

8. The ionizer mounting structure for a vehicle air conditioning system according to claim 1, wherein the discharge electrode insertion hole is formed in a slot shape to ensure that the discharge electrode insertion hole does not hinder movement of the discharge electrodes when the ionizer is slid between the demounting position (Y) and the mounting position (X).

9. The ionizer mounting structure for a vehicle air conditioning system according to claim 1, wherein the mounting and demounting means is provided to removably mount the ionizer to an upper surface of a blower case of the air conditioning case.

10. An ionizer mounting structure for a vehicle air conditioning system, the air conditioning system including an air conditioning case having an internal passageway and an ionizer for generating negative ions and positive ions within the internal passageway, the air conditioning case having a discharge electrode insertion hole, the ionizer having a plurality of discharge electrodes extending into the internal passageway through the discharge electrode insertion hole, wherein the ionizer mounting structure comprises a mounting and demounting means for allowing the ionizer to be mounted to the air conditioning case through sliding movement from a demounting position (Y) on a passenger room side (A) to a mounting position (X) above the air conditioning case and for allowing the ionizer to be demounted from the air conditioning case through sliding movement from the mounting position (X) to the demounting position (Y), the mounting and demounting means comprising a guide means for guiding the ionizer as the ionizer is slidingly moved between the demounting position (Y) and the mounting position (X) and a fixing means for fixing the ionizer to the air conditioning case in the mounting position (X), wherein the fixing means includes an engagement hook and an engagement protrusion formed in a side portion of the ionizer and in the air conditioning case so that the engagement protrusion can engage with the engagement hook in the mounting position (X).

11. An ionizer mounting structure for a vehicle air conditioning system, the air conditioning system including an air conditioning case having an internal passageway and an ionizer for generating negative ions and positive ions within the internal passageway, the air conditioning case having a discharge electrode insertion hole, the ionizer having a plurality of discharge electrodes extending into the internal passageway through the discharge electrode insertion hole, wherein the ionizer mounting structure comprises a mounting and demounting means for allowing the ionizer to be mounted to the air conditioning case through sliding movement from a demounting position (Y) on a passenger room side (A) to a mounting position (X) above the air conditioning case and for allowing the ionizer to be demounted from the air conditioning case through sliding movement from the mounting position (X) to the demounting position (Y), the mounting and demounting means comprising a guide means for guiding the ionizer as the ionizer is slidingly moved between the demounting position (Y) and the mounting position (X) and a fixing means for fixing the ionizer to the air conditioning case in the mounting position (X), wherein the fixing means comprises a fixing piece formed in the ionizer and a fastening member for fastening the fixing piece of the ionizer to the air conditioning case in the mounting position (X), and wherein the mounting and demounting means further comprises an auxiliary fixing means for fixing a side portion of the ionizer in place, the auxiliary fixing means including an auxiliary fixing piece formed in a side portion of the ionizer and an engagement slot formed in the air conditioning case so that the auxiliary fixing piece can engage with the engagement slot.

* * * * *